UNITED STATES PATENT OFFICE.

DANIEL U. SNYDER, OF PHILADELPHIA, PENNSYLVANIA.

IMPROVEMENT IN COVERINGS FOR STEAM-BOILERS, STEAM-PIPES, &c.

Specification forming part of Letters Patent No. 149,689, dated April 14, 1874; application filed January 3, 1874.

*To all whom it may concern:*

Be it known that I, DANIEL U. SNYDER, of the county and city of Philadelphia, and State of Pennsylvania, have invented certain new and useful Improvements in the Covering for Steam-Boilers, Steam-Pipes, &c., as will hereafter be more fully described; and I do declare that the following is a full, clear, and exact description thereof, that will enable others skilled in the art to which it appertains to make and use the same.

The object of my invention is to produce an elastic or flexible, indestructible, fire-proof, and non-conducting (of heat or cold) composition for covering the surface of any body in which an even or uniform temperature is desired, and from which either heat or cold may be excluded, such as steam-boilers, steam-pipes, furnaces, hot or cold water pipes, filling the walls of refrigerators, iron safes, ice-chests, ice-houses, cars for the transportation of ice, tanks, vats, and indeed for lining or filling all kinds of vessels or bodies when any of the aforesaid results may be desired.

My cement felting has been successfully tried in some of the great iron-works in different States, upon hot-blast pipes, where it is subjected to the most intense heat known to this class of pipeage.

I am well aware of the various other compositions that have from time to time been patented to serve the same purpose which I claim for my invention. While my invention differs from all other inventions of its class in nearly every one of its component parts, yet there is a more important feature of its merits than has hitherto been named, namely, its great economy. This is one of the main and absolutely reliable features of my cement felting. With any other felting frequent repetitions of covering are required, as is well-known; but when a boiler or pipe is once covered with my cement felting it is forever finished. By absolute test it is known to save twenty-five or thirty per centum in fuel. It is non-inflammable, indestructible, and a perfect non-conductor of heat or cold. Its flexibility causes it to contract and expand with the iron surface, thus preventing it from cracking. As it absorbs no moisture and excludes the atmosphere the surface of the boiler or pipe cannot corrode. It is applied in a plastic state upon a hot surface with facility, and in a few hours becomes dry, light, elastic, and tenaciously adhesive.

The ingredients used in the composition of my cement felting as above described are, lime, sawdust, kaolin, soapstone, and cotton dust or pickings. These component parts I combine in nearly the following proportions: Lime, (slaked or fell,) one bushel; sawdust, five pounds; kaolin, twenty pounds; soapstone, ten pounds; cotton dust or pickings, fifteen pounds.

To some extent the above proportions may be varied and the result will not be substantially changed; and it is not improbable that further research and experiments may prove that some change in the above proportions may be of advantage; but I have found by actual experience that the above-described proportions give very good satisfaction for the use and purpose above described.

The above ingredients I mix with water until the compound becomes of about the consistency of mortar. In this state it is applied to the exterior surfaces of steam-boilers, steam-pipes, or other surfaces to be coated with it. I generally apply it in three coats, the final coating making my cement felting about one inch thick. Of course, in filling safes, refrigerators, or other like bodies where adhesion is not a matter to be considered, it may be filled into the walls of such bodies at once. In some cases, where adhesion and firmness are objects of more than ordinary importance, or the coating is to be subjected to an unusually severe test in these respects, I use a wire netting between the second and third coats of my felting in order to bind more firmly the coating to the boiler, pipes, or other similar articles to which it is applied. This wire netting completely encircles the boiler or pipe, and is embedded in the coating. This netting may be made of coarse or fine wire, and it may be quite closely woven together, or it may show quite large open spaces between the wires. My cement felting, whether used with or without the wire netting, is applied in the first instance directly to the surface of the boiler or pipe.

I am aware that wire netting has been used to surround boilers, pipes, &c., by leaving an air-space between the wire and the exterior surface of the boiler or pipe, and that a felting has been fastened then to this wire netting, the object of that netting being to prevent the immediate destruction of the felting by the heat from the boiler or pipe. The wire netting is used by me in a different place, for a different purpose, and in a different manner. My cement felting can be applied at any time while the boilers or pipes are in use.

Having now fully described the nature and extent of my invention, and the method of its use, what I claim, and desire to secure by Letters Patent, is—

A composition or cement composed of lime, sawdust, kaolin, soapstone, and cotton dust or pickings, or their equivalents, substantially compounded as and applied for the purposes hereinbefore specified.

DANIEL U. SNYDER.

In presence of—
CHAS. E. ROBERTS,
T. A. SNYDER.